United States Patent
Hsu (10) Patent No.: US 7,954,781 B2
(45) Date of Patent: Jun. 7, 2011

(54) FLAT PANEL DISPLAY SUPPORT WITH A HINGE ASSEMBLY

(75) Inventor: Chun-Ching Hsu, Shulin (TW)

(73) Assignee: Shin Zu Shing Co, Ltd., Taipei Hsien (TW)

( * ) Notice: Subject to any disclaimer, the term of this patent is extended or adjusted under 35 U.S.C. 154(b) by 747 days.

(21) Appl. No.: 12/005,585

(22) Filed: Dec. 27, 2007

(65) Prior Publication Data

US 2009/0166500 A1  Jul. 2, 2009

(51) Int. Cl.
*A47G 29/00* (2006.01)

(52) U.S. Cl. ........ 248/371; 248/127; 248/126; 248/917; 248/919; 248/923; 361/679.02; 361/679.05; 16/307; 16/285

(58) Field of Classification Search ............... 248/176.1, 248/185.1, 278.1, 291.1, 919, 922, 923, 121, 248/127, 126, 284.1, 917; 361/679.02, 679.05, 361/679.21, 679.22; 16/307, 285, 337, 338, 16/340

See application file for complete search history.

(56) References Cited

U.S. PATENT DOCUMENTS

| | | | | |
|---|---|---|---|---|
| 4,944,481 A * | 7/1990 | Yurchenco et al. | ........ | 248/372.1 |
| 5,812,368 A * | 9/1998 | Chen et al. | ........... | 361/679.06 |
| 5,894,633 A * | 4/1999 | Kaneko | ........... | 16/306 |
| 6,018,847 A * | 2/2000 | Lu | ........... | 16/337 |
| 6,601,810 B2 * | 8/2003 | Lee | ........... | 248/278.1 |
| 6,698,063 B2 * | 3/2004 | Kim et al. | ........... | 16/337 |
| 7,061,753 B2 * | 6/2006 | Michoux et al. | ........ | 361/679.05 |
| 7,072,175 B2 * | 7/2006 | Ho | ........... | 361/679.21 |
| 7,124,984 B2 * | 10/2006 | Yokouchi et al. | ........ | 248/125.8 |
| 7,150,440 B2 * | 12/2006 | Yuan | ........... | 248/372.1 |
| 7,198,237 B2 * | 4/2007 | Cho et al. | ........... | 248/133 |
| 7,245,481 B2 * | 7/2007 | Shimizu et al. | ........ | 361/679.08 |
| 7,257,861 B2 * | 8/2007 | Lee et al. | ........... | 16/338 |
| 7,267,312 B2 * | 9/2007 | Kang et al. | ........... | 248/291.1 |
| 7,472,459 B2 * | 1/2009 | Lee et al. | ........... | 16/342 |
| 7,474,522 B2 * | 1/2009 | Bliven | ........... | 361/679.22 |
| 7,499,265 B2 * | 3/2009 | She | ........... | 361/679.22 |
| 7,775,494 B2 * | 8/2010 | Yen et al. | ........... | 248/284.1 |
| 2004/0055114 A1 * | 3/2004 | Lu | ........... | 16/340 |
| 2006/0226307 A1 * | 10/2006 | Kim et al. | ........... | 248/121 |
| 2007/0090233 A1 * | 4/2007 | Choi | ........... | 248/122.1 |

\* cited by examiner

*Primary Examiner* — Kimberly T Wood (74) *Attorney, Agent, or Firm* — Jackson Walker LLP (57) ABSTRACT

A flat panel display (FPD) support with a hinge assembly has a base, a stand and a hinge assembly. The stand has a base bracket being securely mounted on the base, an arm protruding from a front edge of the base bracket and a panel bracket protruding from an upper edge of the arm. The hinge assembly is mounted on the panel bracket and is attached to a FPD. Therefore, the base can customized to allow the FPD and the stand to stably stand on the base. Moreover, the stand and the base may be disassembled and folded conveniently.

19 Claims, 6 Drawing Sheets

FLAT PANEL DISPLAY SUPPORT WITH A HINGE ASSEMBLY

BACKGROUND OF THE INVENTION

1. Field of the Invention

The present invention relates to a flat panel display (FPD) support, especially to an FPD support with a hinge assembly that connects an FPD to the FPD support.

2. Description of the Prior Arts

A flat panel display (FPD) is mounted on an FPD support using a hinge. The hinge is mounted on the FPD support. The FPD is attached to the hinge to allow the FPD to rotate relative to the FPD support and to adjust an angle of the FPD.

Figure 6:
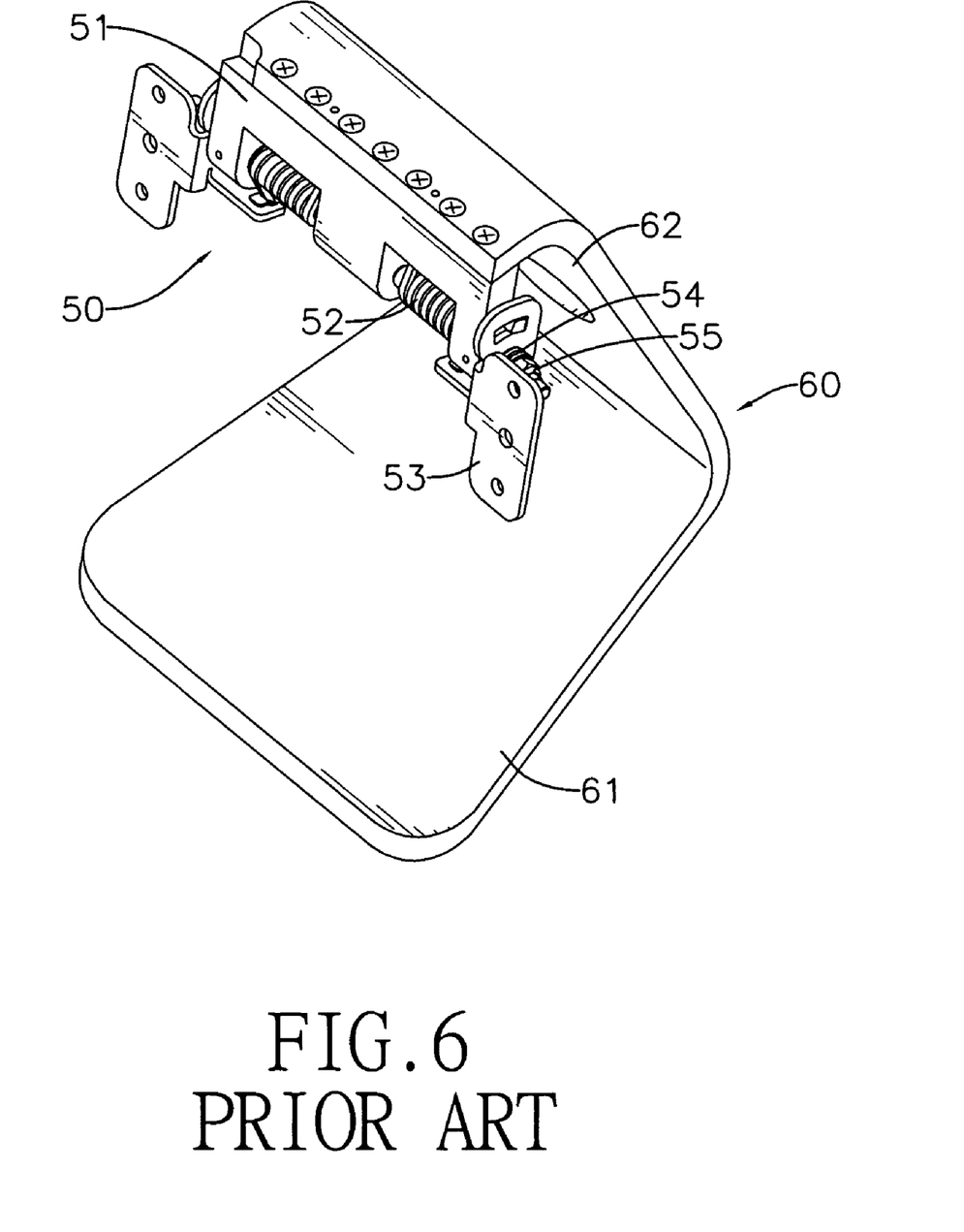
FIG. 6 is a perspective view of a conventional FPD support in accordance with the prior art.

With reference to FIG. 6, a conventional FPD support (60) stands on a surface and has a base (61) and an arm (62). The base (61) lies on the surface and has an edge. The arm (62) is formed on and protrudes obliquely from the edge of the base (61) and has a distal edge.

A conventional hinge (50) is attached to the distal edge of the arm (62) and has a bracket (51), a shaft, two springs (52), two FPD connectors (53), two biasing members (54) and two fasteners (55). The bracket (51) is attached to the distal edge of the arm (62). The shaft is mounted through the bracket (51) and has two ends. The springs (52) are respectively mounted around the shaft and each spring (52) has an inner end and an outer end. The inner end of the spring (52) is fastened to the bracket (51). The FPD connectors (53) are respectively and oppositely mounted around the shaft beside the springs (52) and respectively abut the outer ends of the springs (52). The biasing members (54) are respectively and oppositely mounted around the shaft beside the FPD connectors (53). The fasteners (55) respectively fasten onto the ends of the shaft to hold the biasing members (54) securely between the fasteners (55) and the FPD connectors (53).

An FPD is attached to the FPD connectors (53) of the hinge (50) to allow the FPD to rotate relative to the FPD support (60) and to adjust an angle of the FPD.

However, the conventional FPD support (60) is formed in one piece so the arm (62) and base (61) have fixed positions and relative sizes. Therefore, the base (61) of the conventional FPD support (60) is usually small for the convenience of storage and packaging. Consequently, when the FPD is attached to the conventional hinge (50), the conventional FPD support (60) might topple over and cause damages to the FPD.

To overcome the shortcomings, the present invention provides a FPD supporter with a hinge assembly to mitigate or obviate the aforementioned problems.

SUMMARY OF THE INVENTION

The main objective of the present invention is to provide a flat panel display (FPD) support with a hinge assembly that has a base, a support and a hinge assembly.

The support has a base bracket being securely mounted on the base, an arm protruding from a front edge of the base bracket and a panel bracket protruding from an upper edge of the arm. The hinge assembly is mounted onto the panel bracket and is attached to a FPD.

Therefore, the base can be customized to allow the FPD and the support to stably stand on the base. Moreover, the support and the base may be disassembled and folded conveniently.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
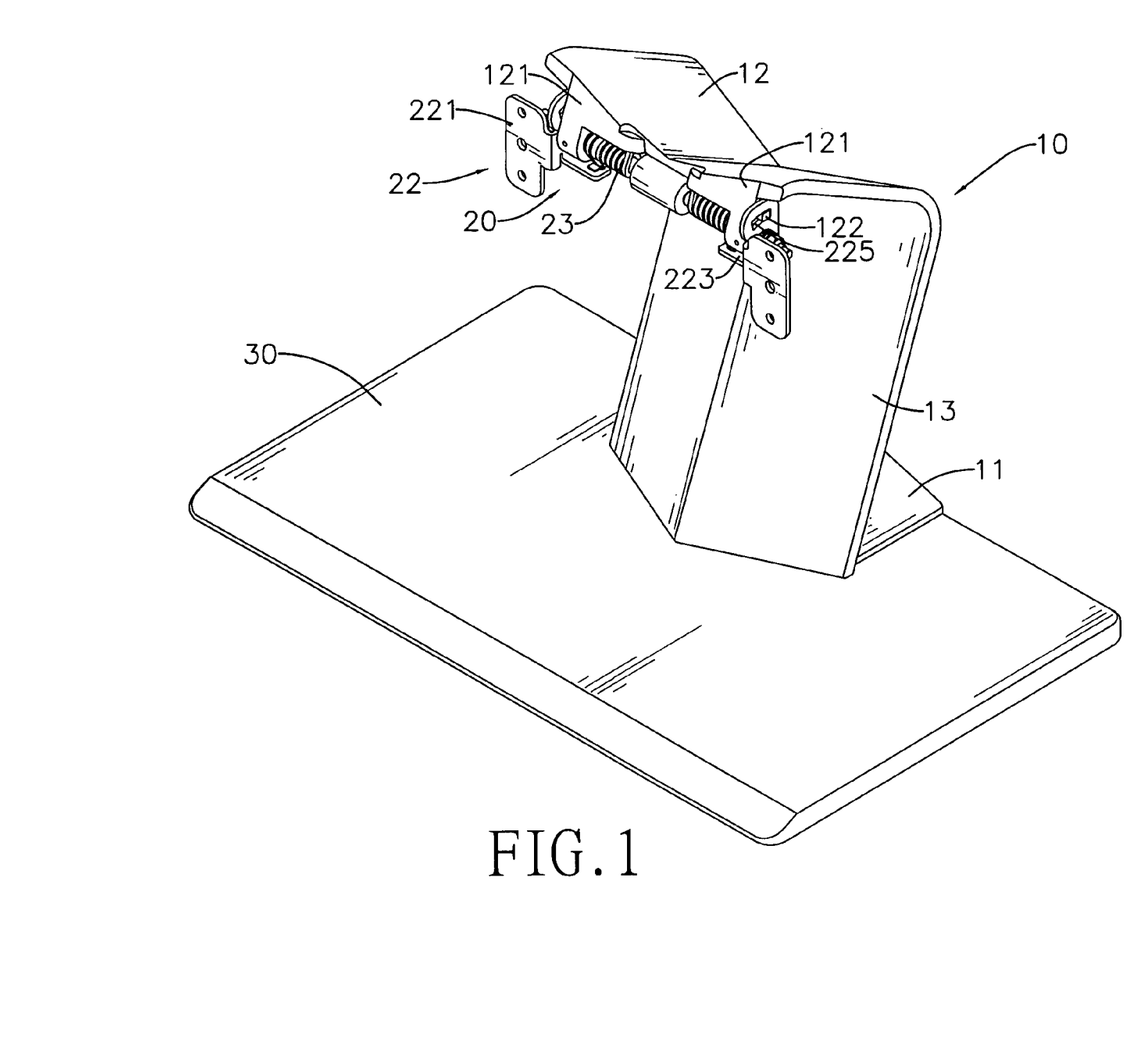
FIG. 1 is a perspective view of a flat panel display (FPD) support with a hinge assembly in accordance with the present invention.

With reference to FIG. 1, a flat panel display (FPD) support with a hinge assembly in accordance with the present invention comprises a base (30), a stand (10) and a hinge assembly (20).

Figure 2:
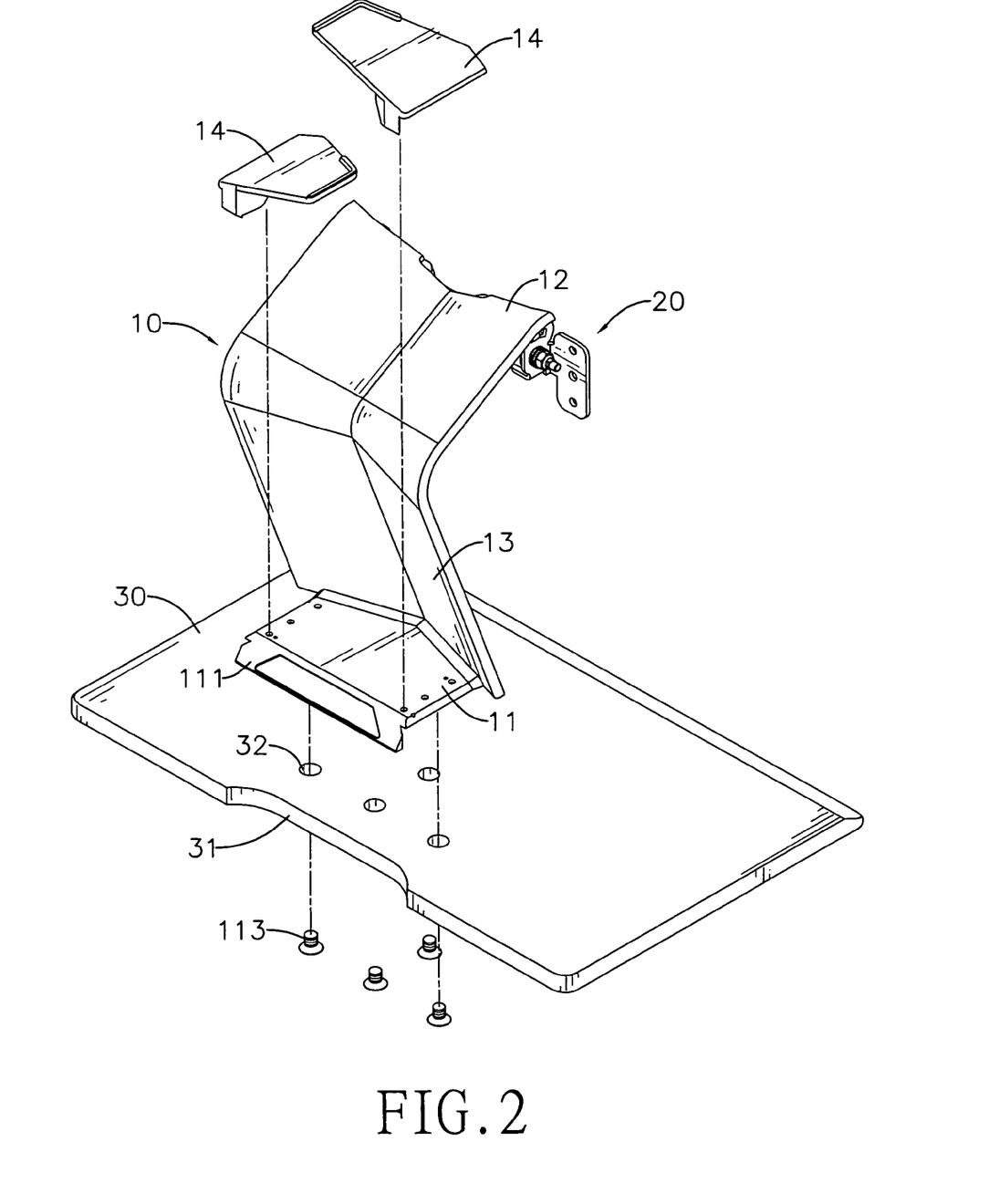
FIG. 2 is a partially exploded, rear perspective view of the FPD support in FIG. 1.

With further reference to FIG. 2, the base (30) may be tempered glass and has a rear edge, a bottom, an optional arm recess (31) and multiple optional positioning holes (32). The arm recess (31) is formed in the rear edge of the base (30). The positioning holes (32) are respectively formed through the base (30) near the arm recess (31).

The stand (10) is securely mounted on the base (30), is substantially Z-shaped and has a base bracket (11), an arm (13), a panel bracket (12) and two optional covers (14).

Figure 4:
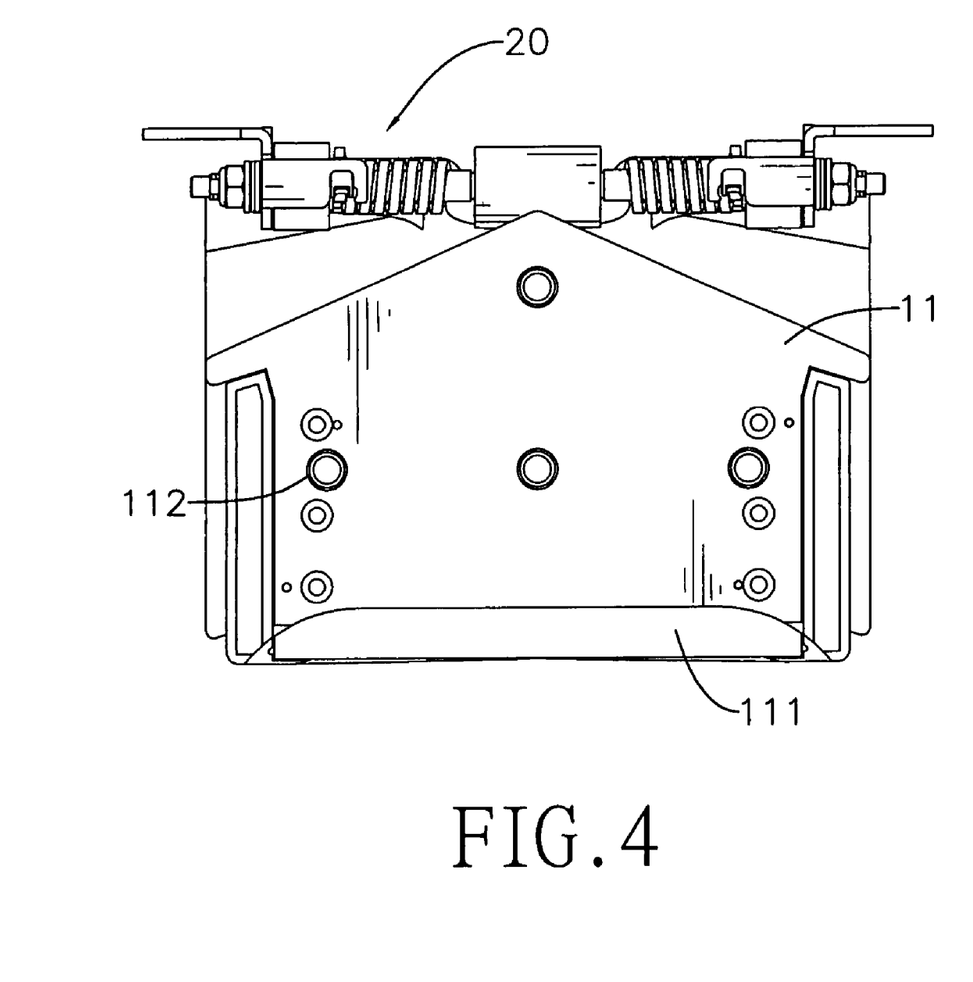
FIG. 4 is a bottom view of the stand and the hinge assembly in FIG. 3.

With further reference to FIG. 4, the base bracket (11) is securely mounted on the base (30), has a rear edge, a front edge, a bottom and a top and may have a positioning protrusion (111), multiple positioning bosses (112) and multiple fasteners (113). The positioning protrusion (111) is formed on and protrudes from the rear edge of the base bracket (11) and is mounted in the arm recess (31) of the base (30). The positioning bosses (112) are formed on and protrude respectively from the bottom of the base bracket (11), respectively correspond to and are mounted respectively in the positioning holes (32) of the base (30). The fasteners (113) are respectively mounted through the bottom of the base (30) and are mounted securely in the stand (10), and may be mounted respectively through the positioning holes (32), and may be mounted respectively in the positioning bosses (112) of the base bracket (11) of the stand (10) to hold the stand (10) securely on the base (30).

The arm (13) is formed on and protrudes obliquely from the front edge of the base bracket (11), may be V-shaped in cross-section to allow the stand (10) to sustain more weight and has an upper edge.

Figure 3:
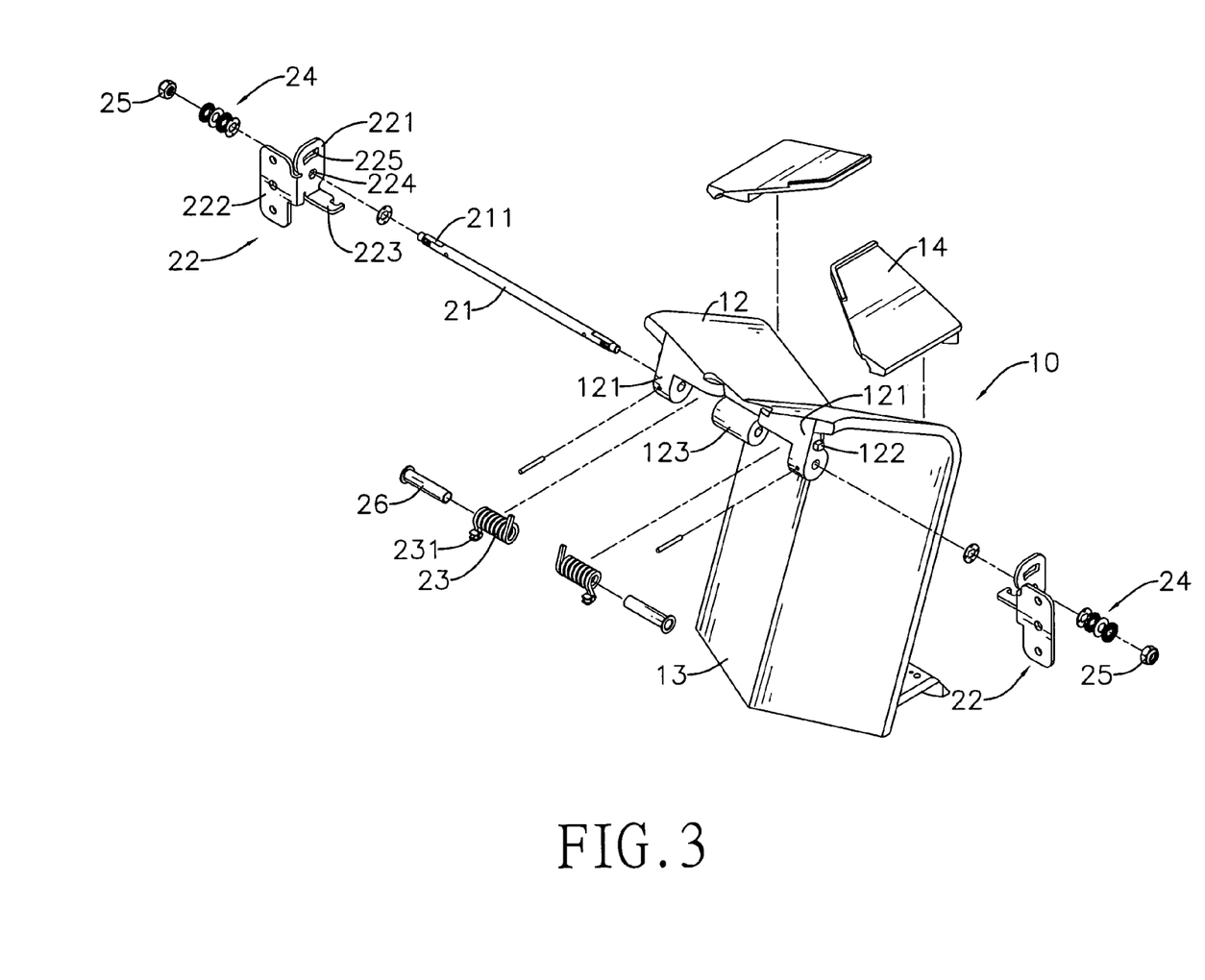
FIG. 3 is an enlarged exploded perspective view of a stand and a hinge assembly of the FPD support in FIG. 1.

With further reference to FIG. 3, the panel bracket (12) is formed on and protrudes obliquely from the upper edge of the arm (13) oppositely relative to the base bracket (11), may be V-shaped in cross-section to allow the stand (10) to sustain more weight and has a distal edge, two mounting tubes (121) and an optional guiding tube (123). The mounting tubes (121) are respectively formed on and protrude transversely from the distal edge of the panel bracket (12) and are coaxial with each other. Each mounting tube (121) has an outer end and a optional sliding protrusion (122). The sliding protrusion (122) is formed on and protrudes from the outer end of the mounting tube (121). The guiding tube (123) is formed on and protrudes transversely from the distal edge of the panel bracket (12) and is formed between the mounting tubes (121).

The covers (14) are mounted respectively and securely on the top of the base bracket (11) of the stand (10) to store wires between the covers (14) and the base bracket (11) of the stand (10).

Figure 5:
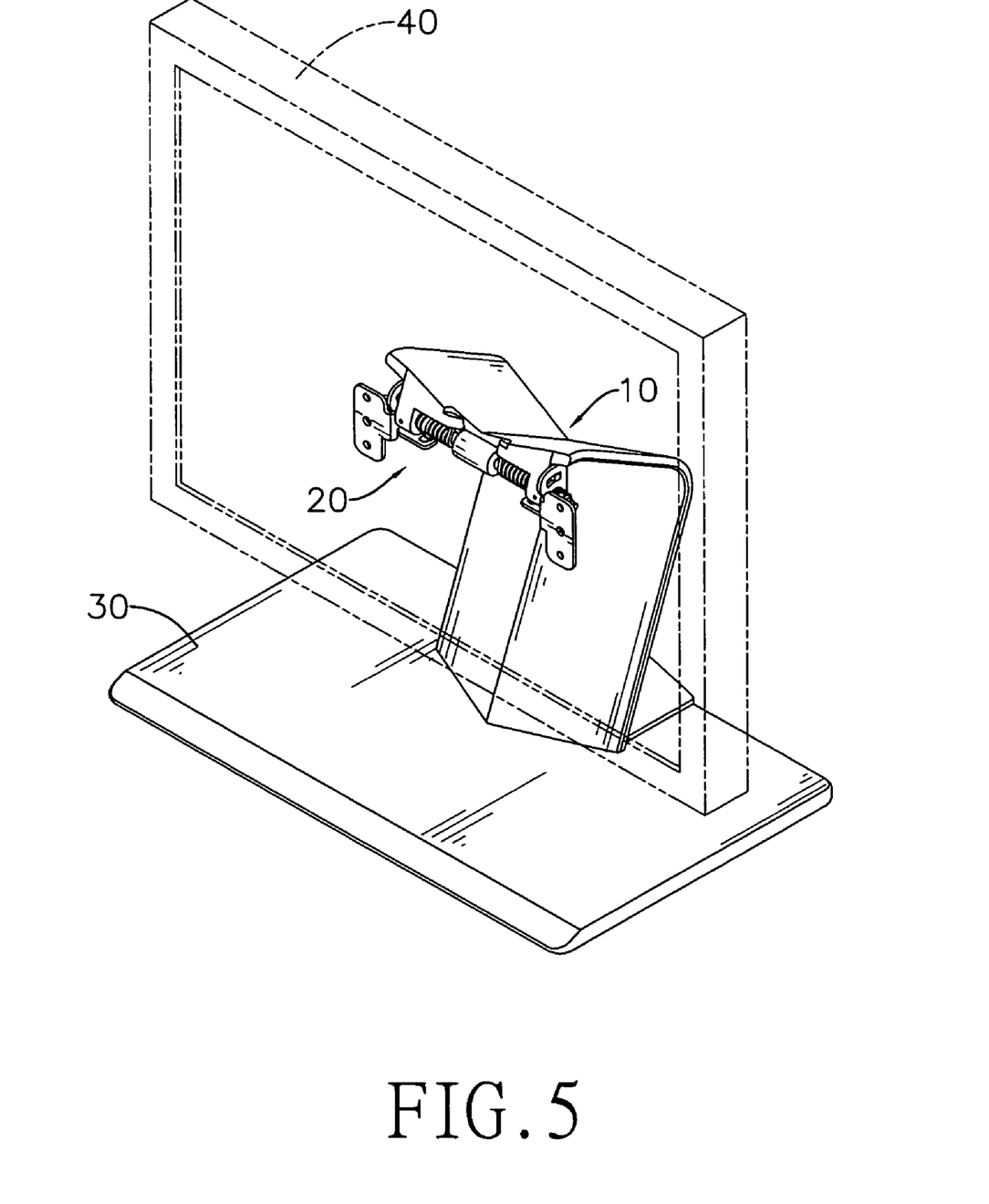
FIG. 5 is an operational perspective view of the FPD support with the conventional hinge in FIG. 1, an FPD shown in phantom lines.

With further reference to FIG. 5, the hinge assembly (20) is mounted in the mounting tubes (121) of the panel bracket (12) of the stand (10), is attached to the FPD (40) and has a shaft (21), two FPD connectors (22), at least one spring (23), at least one optional sleeve (26), two washer assemblies (24) and two fasteners (25).

The shaft (21) is mounted through the mounting tubes (121) of the panel bracket (12) of the stand (10), may be mounted through the guiding tube (123) of the panel bracket (12) and has two ends and two mounting rods (211). The mounting rods (211) are respectively formed on and protrude coaxially from the ends of the shaft (21), are non-circular in cross-section and protrude out of the outer ends of the mounting tubes (121). Each mounting rod (211) has a distal end.

The FPD connectors (22) are respectively and rotatably mounted around the mounting rods (211) of the shaft (21), respectively abut the outer ends of the mounting tubes (121), are attached to the FPD (40) and each FPD connector (22) has a positioning wing (221), a guide slot (225), a connecting wing (222) and an abutting wing (223). The positioning wing (221) is mounted around the mounting rod (211) of the shaft (21), abuts the outer end of the mounting tube (121) and has a front edge, a bottom edge, two surfaces and a pivot hole (224). The pivot hole (224) is formed through the positioning wing (221) and is rotatably mounted around the mounting rod (211) of the shaft (21). The guide slot (225) is formed through the FPD connector (22), may be formed through the positioning wing (221) near the pivot hole (224), corresponds to and is mounted slidably around the sliding protrusion (122) of the mounting tube (121) to limit the rotating angle of the FPD (40). The connecting wing (222) is formed on and protrudes transversely from the front edge of the positioning wing (221) and is attached to the FPD (40). The abutting wing (223) is formed on and protrudes from the bottom edge of the positioning wing (221).

The at least one spring (23) is mounted around the shaft (21) and is mounted between the mounting tubes (121). Each one of the at least one spring (23) may be mounted between the guiding tube (123) and one of the mounting tube (121) and has an inner end, an outer end and an optional clip (231). The inner end of the spring (23) is fastened to the panel bracket (12) of the stand (10). The outer end of the spring (23) abuts one of the FPD connector (22), may abut the abutting wing (223) of the FPD connector (22). The clip (231) is mounted securely on the outer end of the spring (23) clamps the abutting wing (223) of the FPD connector (22) to allow the rotation of the FPD connectors (22) relative to the shaft (21) while maintaining stability and reducing frictional noise of the abutting wing (223) and the spring (23).

The at least one sleeve (26) is mounted around the shaft (21) and each one of the at least one sleeve (26) is mounted in the corresponding spring (23) to avoid the friction between the spring (23) and the shaft (21).

The washer assemblies (24) are respectively mounted securely around the mounting rods (211) of the shaft (21) adjacent to the surfaces of each positioning wing (221) of the FPD connector (22).

The fasteners (25) are respectively mounted on the distal ends of the mounting rods (211) of the shaft (21) to hold the FPD connectors (22) and the washer assemblies (24) between the mounting tubes (121) and the fasteners (25).

The FPD support with a hinge assembly as described has the following advantages. Since the base bracket (11) of the stand (10) is securely mounted onto the base (30) and the FPD (40) is attached to the FPD connectors (22) of the hinge assembly (20), the base (30) can be adapted to different sizes easily to allow the FPD (40) and the stand (10) to stably stand on the base (30). Moreover, the stand (10) and the base (30) may be disassembled and folded conveniently for storage and packaging.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A flat panel display (FPD) support with a hinge assembly comprising
    a base having
        a rear edge; and
        a bottom
    a stand being securely mounted on the base and having
        a base bracket being securely mounted on the base and having
            a rear edge;
            a front edge;
            a bottom; and
            a top;
        an arm being formed on and protruding obliquely from the front edge of the base bracket and having an upper edge; and
        a panel bracket being formed on and protruding obliquely from the upper edge of the arm oppositely relative to the base bracket and having
            a distal edge; and
            two mounting tubes being respectively formed on and protruding transversely from the distal edge of the panel bracket and being coaxial with each other, and each mounting tube having an outer end; and
    a hinge assembly being mounted in the mounting tubes of the panel bracket of the stand.

2. The FPD support with the hinge assembly as claimed in claim 1, wherein
    the base further has multiple positioning holes being respectively formed through the base; and
    the base bracket of the stand further has
        multiple positioning bosses being formed on and protruding respectively from the bottom of the base bracket, respectively corresponding to and being mounted in the positioning holes of the base; and
        multiple fasteners being respectively mounted through the positioning holes in the bottom of the base and securely mounted respectively in the positioning bosses of the base bracket of the stand.

3. The FPD support with the hinge assembly as claimed in claim 2, wherein
    the base further has an arm recess being formed in the rear edge of the base;
    the positioning holes of the base are near the recess; and
    the base bracket of the stand further has a positioning protrusion being formed on and protruding from the rear edge of the base bracket and being mounted in the arm recess of the base.

4. The FPD support with the hinge assembly as claimed in claim 1, wherein
  each mounting tube has a sliding protrusion being formed on and protruding from the outer end of the mounting tube; and
  the hinge assembly has
    a shaft being mounted through the mounting tubes of the panel bracket of the stand and having
      two ends; and
      two mounting rods being respectively formed on and protruding coaxially from the ends of the shaft, being non-circular in cross-section, respectively protruding out of the outer ends of the mounting tubes and each mounting rod having a distal end;
    two FPD connectors being respectively and rotatably mounted around the mounting rods of the shaft, respectively abutting the outer ends of the mounting tubes and each FPD connector having a guide slot being formed through the FPD connector and corresponding to and being mounted slidably around the sliding protrusion of a corresponding mounting tube;
    a spring being mounted around the shaft, being mounted between the mounting tubes and having
      an inner end being fastened to the panel bracket of the stand; and
      an outer end abutting one of the FPD connector;
    two washer assemblies being respectively mounted securely around the mounting rods of the shaft adjacent to the FPD connector; and
    two fasteners being respectively mounted on the distal ends of the mounting rods of the shaft.
5. The FPD support with the hinge assembly as claimed in claim 3, wherein
  each mounting tube has a sliding protrusion being formed on and protruding from the outer end of the mounting tube; and
  the hinge assembly has
    a shaft being mounted through the mounting tubes of the panel bracket of the stand and having
      two ends; and
      two mounting rods being respectively formed on and protruding coaxially from the ends of the shaft, being non-circular in cross-section, respectively protruding out of the outer ends of the mounting tubes and each mounting rod having a distal end;
    two FPD connectors being respectively and rotatably mounted around the mounting rods of the shaft, respectively abutting the outer ends of the mounting tubes and each FPD connector having a guide slot being formed through the FPD connector and corresponding to and being mounted slidably around the sliding protrusion of a corresponding mounting tube;
    a spring being mounted around the shaft, being mounted between the mounting tubes and having
      an inner end fastening to the panel bracket of the stand; and
      an outer end abutting one of the FPD connector;
    two washer assemblies being respectively mounted securely around the mounting rods of the shaft adjacent to the FPD connector; and
    two fasteners being respectively mounted on the distal ends of the mounting rods of the shaft.
6. The FPD support with the hinge assembly as claimed in claim 4, wherein
  each FPD connector further has
    a positioning wing being mounted around a corresponding mounting rod of the shaft, abutting the outer end of the corresponding mounting tube and having
      a front edge;
      a bottom edge;
      two surfaces; and
      a pivot hole being formed through the positioning wing and being rotatably mounted around the corresponding mounting rod of the shaft;
    a connecting wing being formed on and protruding transversely from the front edge of the positioning wing; and
    an abutting wing being formed on and protruding from the bottom edge of the positioning wing;
  the guide slot of each FPD connector is formed through the positioning wing near the pivot hole;
  the outer end of the spring abuts the abutting wing of the FPD connector; and
  the washer assemblies are respectively adjacent to the surfaces of each positioning wing.
7. The FPD support with the hinge assembly as claimed in claim 5, wherein
  the FPD connector further has
    a positioning wing being mounted around a corresponding mounting rod of the shaft, abutting the outer end of the corresponding mounting tube and having
      a front edge;
      a bottom edge;
      two surfaces; and
      a pivot hole being formed through the positioning wing and being rotatably mounted around the corresponding mounting rod of the shaft;
    a connecting wing being formed on and protruding transversely from the front edge of the positioning wing; and
    an abutting wing being formed on and protruding from the bottom edge of the positioning wing;
  the guide slot of each FPD connector is formed through the positioning wing near the pivot hole;
  the outer end of the spring abuts the abutting wing of the FPD connector; and
  the washer assemblies are respectively adjacent to the surfaces of each positioning wing.
8. The FPD support with the hinge assembly as claimed in claim 6, wherein
  the hinge assembly further has a sleeve being mounted around the shaft and being mounted in the spring; and
  the spring further has a clip being mounted securely on the outer end of the spring and clamping the abutting wing of the FPD connector.
9. The FPD support with the hinge assembly as claimed in claim 7, wherein
  the hinge assembly further has a sleeve being mounted around the shaft and being mounted in the spring; and
  the spring further has a clip being mounted securely on the outer end of the spring and clamping the abutting wing of the FPD connector.
10. The FPD support with the hinge assembly as claimed in claim 8, wherein the arm and the panel bracket are V-shaped in cross-section.
11. The FPD support with the hinge assembly as claimed in claim 9, wherein the arm and the panel bracket are V-shaped in cross-section.
12. The FPD support with the hinge assembly as claimed in claim 10, wherein the stand further has two covers being mounted respectively and securely on the top of the base bracket of the stand.

13. The FPD support with the hinge assembly as claimed in claim 11, wherein the stand further has two covers being mounted respectively and securely on the top of the base bracket of the stand.

14. The FPD support with the hinge assembly as claimed in claim 12, wherein
the panel bracket of the stand further has a guiding tube being formed on and protruding transversely from the distal edge of the panel bracket and being formed between the mounting tubes;
the shaft of the hinge assembly is mounted through the guiding tube of the panel bracket; and
the spring is mounted between the guiding tube and one of the mounting tube.

15. The FPD support with the hinge assembly as claimed in claim 13, wherein
the panel bracket of the stand further has a guiding tube being formed on and protruding transversely from the distal edge of the panel bracket and being formed between the mounting tubes;
the shaft of the hinge assembly is mounted through the guiding tube of the panel bracket; and
the spring is mounted between the guiding tube and one of the mounting tube.

16. The FPD support with the hinge assembly as claimed in claim 14, wherein the base is tempered glass.

17. The FPD support with the hinge assembly as claimed in claim 15, wherein the base is tempered glass.

18. The FPD support with the hinge assembly as claimed in claim 16, wherein the stand is substantially Z-shaped.

19. The FPD support with the hinge assembly as claimed in claim 17, wherein the stand is substantially Z-shaped.

* * * * *